April 26, 1932. T. O. SCHRADER 1,855,996
CLOSURE FASTENER
Filed Oct. 6, 1931 2 Sheets-Sheet 1

Inventor
Thomas O. Schrader

Strauch & Hoffman
Attorneys

April 26, 1932.   T. O. SCHRADER   1,855,996
CLOSURE FASTENER
Filed Oct. 6, 1931   2 Sheets-Sheet 2

Inventor
Thomas O. Schrader

By
Strauch & Hoffman
Attorneys

Patented Apr. 26, 1932

1,855,996

UNITED STATES PATENT OFFICE

THOMAS O. SCHRADER, OF ALLENTOWN, PENNSYLVANIA, ASSIGNOR TO THE DENT HARDWARE COMPANY, OF FULLERTON, PENNSYLVANIA, A CORPORATION OF PENNSYLVANIA

CLOSURE FASTENER

Application filed October 6, 1931. Serial No. 567,251.

This invention relates to closure fasteners, particularly of the type in which a keeper secured to the frame surrounding the closure opening is relied upon to retract the bolt of the fastener before it is engaged in the keeper socket.

In constructions heretofore proposed in which a keeper is relied upon to retract the bolt by engagement with the inclined nose ordinarily formed on the keeper-engaging end thereof, it has been proposed to provide the keeper with an anti-friction roller to minimize friction between the end of the bolt and the keeper, and thus reduce the force necessary to retract the bolt. Arrangements of this character are very desirable in heavy refrigerator doors, for example, that require relatively heavy fasteners having springs of sufficient stiffness to firmly hold the heavy door against the frame, because the reduction of friction in such arrangements makes it unnecessary to close the swinging doors, with which such fasteners are usually associated, with violence in order to insure engagement of the bolt in the socket of the keeper. Arrangements heretofore proposed have not been entirely satisfactory in practice because the bolt had a tendency to slip under the roller before entering the socket of the keeper, and in so doing, detracting from the smoothness of operation of the bolt, adding to the noise incident to its operation and making it necessary to close the door with considerable force to insure the entry of the bolt end in the keeper socket.

This invention aims to provide a keeper construction whereby the friction between the end of the bolt and the keeper is minimized during the operation of retracting the bolt, and in which the bolt is guided smoothly from the periphery of the anti-friction roller into a socket in the keeper.

This invention also aims to improve the construction of keepers intended for use with doors of varying thicknesses. In order that a keeper can be adapted to doors of varying thicknesses it is essential to construct it in two parts between which adjustments may be made to vary the position of the socket part with respect to the supporting part. In constructions heretofore proposed for this purpose it has been possible to separate the two relatively adjustable parts of the keeper when the end of the bolt was engaged therein, providing a way by which unauthorized persons could secure access to the interior of the refrigerator or the like, upon which the fastener is used, by disassembling the keeper though the bolt be securely locked in its operative position. This invention has for its further purpose the provision of a keeper construction in which adjustment may be made for varying thicknesses of doors, but in which it is made impossible to disassemble the two parts of the keeper by removing the means that hold them in their proper relative position with the bolt in its locked position.

In the attainment of the purposes just stated, this invention provided a closure fastener including a keeper provided with a plurality of spaced rollers, including a support for the rollers having a guiding portion so disposed with reference to a plane tangent to the periphery of the rollers that the bolt end is guided smoothly from the rollers and directed into the socket of the keeper.

This invention also provides a keeper consisting of a supporting part and a socket part, between which adjustment may be brought about by shifting the socket part along a post forming a part of the supporting part, and in which means are provided to positively prevent the separation of the socket members from the supporting parts by a slidable movement of the former with respect to the latter, to the end that when the bolt is in engagement with the keeper, preventing movement of the socket part of the keeper away from the post, the parts of the keeper cannot be separated.

Further objects of the invention will appear as a description thereof proceeds with reference to the accompanying drawings in which.

Like reference characters indicate like parts throughout the several figures.

Figure 1:
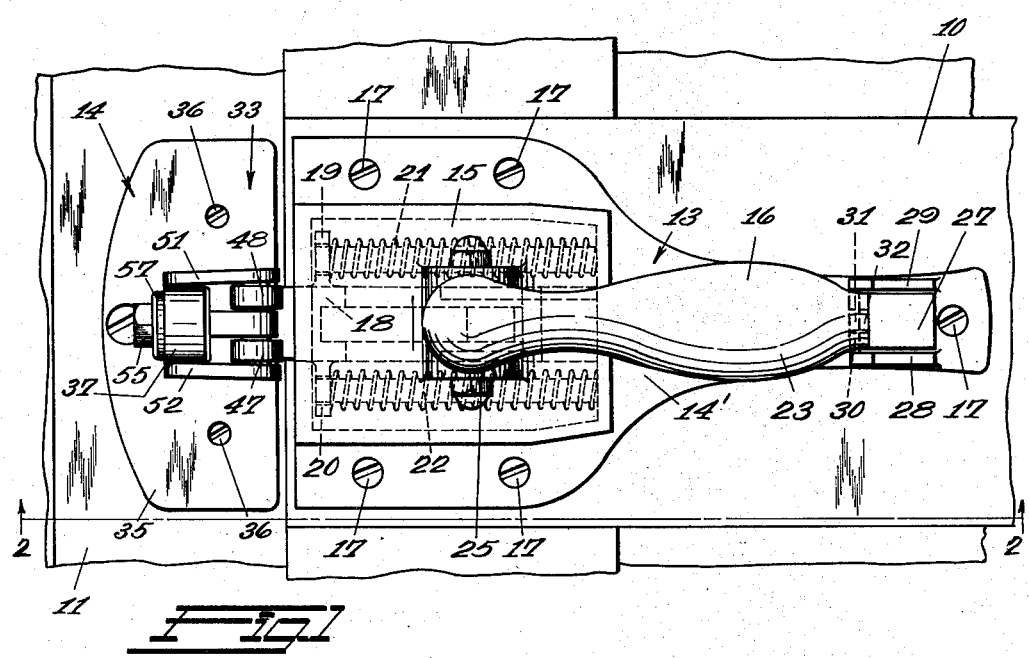
Figure 1 is a fragmentary elevational view showing a preferred embodiment of the invention.

The present invention is intended particularly for use in connection with heavy refrigerator or similar doors, though it may be used in connection with any swinging closure. Numeral 10 indicates a swinging closure of any kind. Numeral 11 designates a portion of the frame surrounding the closure opening. Closure 10 may be arranged so as to provide a part 12 that overlaps the frame 11.

The fastener of the present invention includes a bolt part 13 secured to the door, and a keeper part 14 secured to the frame. Bolt part 13 includes a supporting part 14', a housing part 15, and a bolt operating part 16. The supporting part 14' may be attached to the closure 10 by screws 17 or in any approved manner. Disposed within the housing 15 is a slidably mounted bolt 18 having lugs 19 and 20 extending laterally therefrom. Coil springs 21 and 22, disposed between the lugs 19 and 20 and the end wall of the housing part 15, serve to urge the bolt 18 toward its operative position.

The operating part 16 comprises a handle 23 pivotally mounted upon a pin 24 extending through lugs 25, projecting upwardly from the housing part 15. Said handle 23 is provided with an arm or projection 26 extending through an opening in housing 15 and engaging in a slot in the bolt 18, the arrangement being such that upon operation of the handle 23, the bolt 18 is retracted against the action of the springs 21 and 22 that tend to force it toward its operative position as above stated. Handle 23 is provided with an L-shaped end 27 fitting between a pair of L-shaped lugs 28 and 29 projecting upwardly from the supporting part 14' of this portion of the fastener. The L-shaped lugs 28 and 29, projecting upwardly from the supporting portion 14', are connected by a wall 30 that is perforated at 31, the perforation 31 registering with an aperture 32 provided in one leg of the L-shaped end 27 of the handle 23, when the bolt is in its operative position. Any suitable locking means transversing the aligned apertures or openings 31 and 32 may be used to lock the bolt in its operative position.

Figure 4:
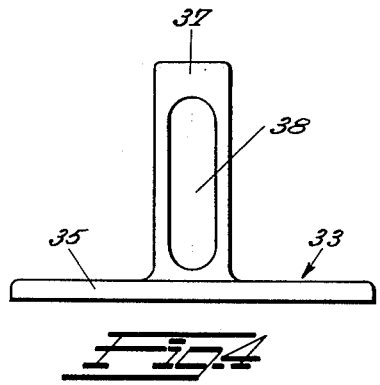
Figures 4 and 5 are respectively side and end elevational views of the supporting parts of the keeper.
Figure 5:
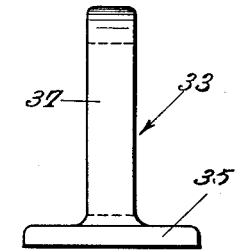
Figure 6:
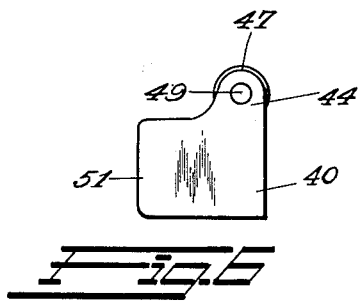
Figures 6, 7 and 8 are respectively side, front end and rear end views of the socket parts of the improved keeper.
Figure 7:
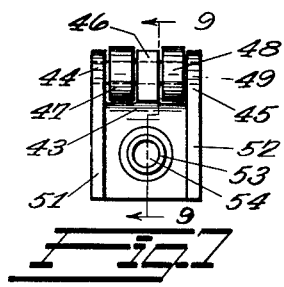

The present invention resides particularly in the keeper construction intended for cooperation with a fastener part, such as just described or with the equivalent of such a fastener. The keeper comprises a supporting part 33 and a socket part 34. The supporting part 33, shown in detail in Figures 4 and 5, comprises a base 35 which may assume any convenient outline, and may be provided with suitable openings to permit the attachment of said base to the closure frame, as by screws 36, Figure 1. The supporting part 33 also comprises a post 37 projecting upwardly from the base 35, which post is provided with an elongated slot 38 for the adjustable reception of the means for holding the socket part in assembled relation with respect to the supporting part 33.

Figure 8:
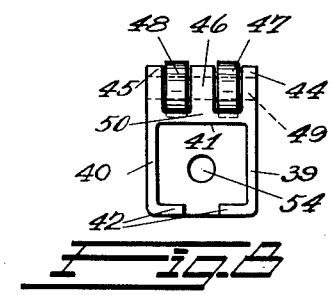
Figure 9:
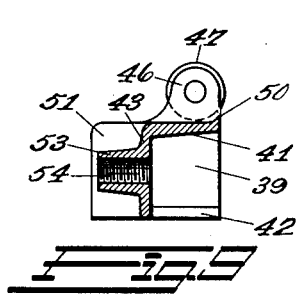
Figure 9 is a sectional view taken on a plane indicated by the line 9—9 in Figure 7.

The socket part 34, illustrated in detail in Figures 6, 7, 8 and 9, consists of a hollow body including side walls 39 and 40, a top wall 41, a bottom wall 42 that may be slotted as illustrated in Figures 8 and 9, to lighten the construction, and a rear wall 43 providing a socket for the reception of the end of the bolt 18 when the latter is in its operative position in the keeper. The top wall 41 is slightly inclined from the forward edge of the keeper toward the rear wall 43 so that when the end of the bolt 18 is projected therein said bolt serves, in moving along the inclined surface of the top portion 41, to wedge the door firmly against the closure frame in a manner known in the art.

In order to smoothly guide the ends of the bolt 18 into the socket defined between the walls 39, 40, 41 and 42 with minimum friction. the walls 39 and 40 are provided with upward projections or lugs 44 and 45 respectively. A third lug 46 projects upwardly between the lugs 44 and 45, said lug extending from the top wall 41 in parallelism with the lugs 44 and 45. A pair of anti-friction rollers 47 and 48 are mounted rotatively between the lugs 44, 46 and 45 upon a pin 49 that extends through said rollers and the lugs. Referring to Figures 8 and 9 it will be observed that the forward wall 50 of the lug 46 coincides with the outer edge of the top wall 41 in the socket, and that said wall 50 is arranged so that it is nearly tangent to the rollers 47 and 48, providing a bolt guiding surface that serves to smoothly guide the bolt from the periphery of the rollers 47 and 48 past the edge of the top wall 41. Any other equivalent arrangement serving to guide the bolt after it leaves the periphery of the roller or rollers, provided on the keeper to minimize friction between the end of the bolt and the keeper, may be employed it being desired that the bolt be not permitted to be advanced substantially by the action of the springs, that tend to force it into the keeper socket, in back of the anti-friction rollers that are provided to contact with the inclined end thereof when the closure is swung toward the closure frame. The arrangement of the present invention whereby the end of the bolt is guided smoothly into the socket of the keeper constitutes an important part of the present invention, since a keeper designed in accordance with said invention serves to reduce the noise of operation in closing the door and to minimize the force necessary to close said door in order to insure that the bolt will be caught behind the wall 41 of the keeper socket.

The side walls 39 and 40 of the body of the socket member are continued rearwardly in the planes of said wall to produce a pair of guide flanges 51 and 52 spaced apart a distance corresponding to the width of the post 37, as measured across the slot 38 therein. The rear wall 43 of the socket member is also provided with a lug 53 of cylindrical or of any convenient form, designed so that it will enter the slot 38 in the post 37 of the supporting portion 33 of the keeper. A threaded opening 54 extends completely through the lug 53 and the rear wall 43 as illustrated in Figure 9.

The socket part is assembled with relation to the supporting part of the keeper by inserting the projection 53 in the slot 38 of the post 37, the guide flanges 51 and 52 contacting with the outer edges of said post. The parts are locked in any adjusted position along the length of the slot 33 by means of a bolt 55 having a threaded shank 56 engaged in the threaded bore or opening 54. A washer 57, having a diameter substantially greater than the width of the slot 58, provides an abutment toward which the keeper part is drawn by means of the bolt 55. The adjustment of the keeper part with respect to the supporting part is provided so that the fastener may be applied to doors of varying thickness or of varying degrees of projection beyond the closure frame, enabling the fastener to be used with various kinds of closures and various closure frames with the capability of adjusting the socket part so that the inclined top wall 41 of the socket is positioned in exactly the correct position, so that the bolt will serve to wedge the door against the frame when it contacts with the slightly inclined surface 41.

Figure 2:
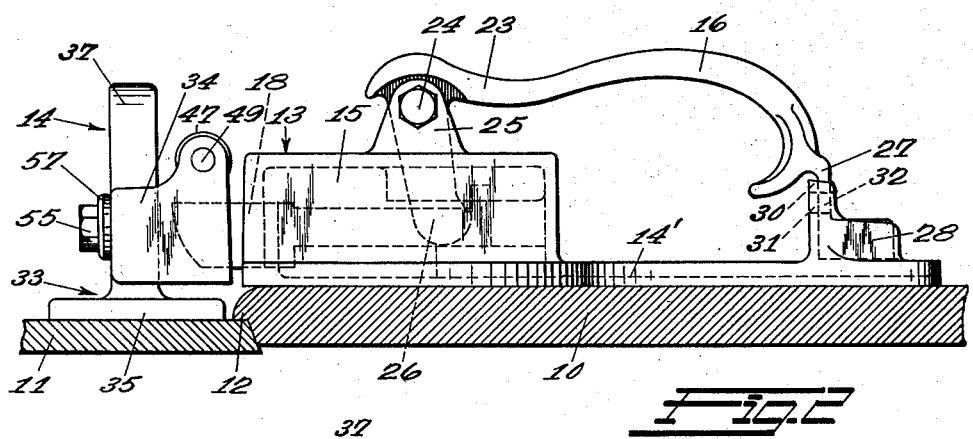
Figure 2 is a sectional view of the parts appearing in Figure 1 taken on the plane indicated by the line 2—2 in Figure 1 looking in the direction of the arrows.
Figure 3:
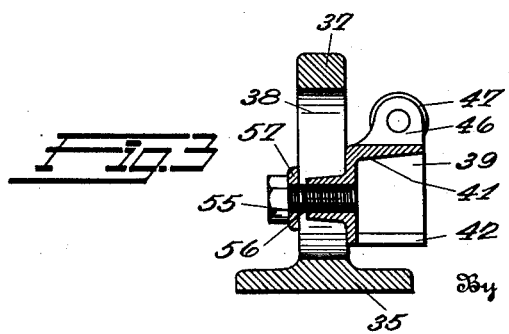
Figure 3 is an enlarged sectional view including a keeper forming an essential part of the present invention.

It will be observed that the projection 53 that enters the slot 38 in the post 37 prevents the disassembly of the socket part of the keeper from the supporting part by removal of the bolt 55, when the bolt 18 of the fastener is engaged in the socket of the keeper, as illustrated in Figures 1 and 2, with the handle 23 locked in position by a suitable locking means traversing the aperture 31 and opening 32. In this position of the bolt, the socket part of the keeper cannot be disassembled by moving the socket part away from the post, because the engagement of the nose of the bolt 18 with the rear wall 43 prevents movement of the socket part in this direction. The socket part can also not be disassembled from the post by sliding it lengthwise of the post, because the projection 53 engaging the end of the slot 38 therein will prevent disassembly in this way. It will thus be seen that means are provided to maintain the keeper part in adjusted position with respect to the supporting part that are so arranged that disassembly of the socket part from the supporting part cannot take place with the bolt locked in the socket of the keeper. It is thus impossible to secure access to anything disposed in back of the closure by disassembly of the keeper when the bolt is locked in position to prevent such access, though the keeper is adjustable to adapt it for use with a wide variety of doors.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. A keeper for the reception of the end of a bolt comprising a supporting part, and a socket part, rotary means on said last named part to reduce friction between the bolt and the keeper as the former moves toward the socket, and means to guide the bolt smoothly from said rotary means into said socket.

2. A keeper for the reception of the end of a bolt comprising a supporting part and a socket part, rotary means on said last named part to reduce friction between the bolt and the keeper as the former moves toward said socket, and a guiding surface on said socket part arranged relatively close to and substantially parallel to a tangent to said rotary means to guide the bolt after it leaves said means smoothly into said socket.

3. A keeper for the reception of the end of a bolt comprising a supporting part and a socket part, means whereby said socket part may be adjusted to vary the position of the socket therein with respect to the supporting part, and means to maintain said parts in adjusted position designed so that disassembly of the socket part from the supporting part can not take place with the bolt locked in said socket.

4. A keeper for the reception of the end of a bolt comprising a supporting part provided with means to attach it to a closure frame and including a slotted post projecting away from said means, and a socket part provided with elements to guide it along said post, and means to clamp said socket part in adjusted position on said post.

5. The combination defined in claim 4 in which said socket part is provided with an integral projection engaged in said slot so that the socket part can not be disassembled from said post by sliding movement along the length thereof.

In testimony whereof I affix my signature.

THOMAS O. SCHRADER.